United States Patent [19]
Caux et al.

[11] Patent Number: 5,551,075
[45] Date of Patent: Aug. 27, 1996

[54] SEMICONDUCTOR DEVICE INCLUDING A PLURALITY OF INTERCONNECTED FUNCTIONAL INTEGRATED CIRCUIT BLOCKS OPERATING AT HIGH AND ULTRAHIGH FREQUENCIES, EACH HAVING A DC DISTRIBUTION LINE

[75] Inventors: Christian Caux, La Garenne Colombes; Patrice Gamand, Yerres, both of France

[73] Assignee: U.S. Philips Corporation, New York, N.Y.

[21] Appl. No.: 66,048

[22] PCT Filed: Oct. 19, 1992

[86] PCT No.: PCT/NL92/00186

§ 371 Date: May 25, 1993

§ 102(e) Date: May 25, 1993

[87] PCT Pub. No.: WO93/08648

PCT Pub. Date: Apr. 29, 1993

[30] Foreign Application Priority Data

Oct. 18, 1991 [FR] France .................................. 91 12919

[51] Int. Cl.⁶ .................................................... H04B 1/28
[52] U.S. Cl. .......................... 455/333; 455/317; 455/341; 330/307; 330/277
[58] Field of Search .................................. 455/333, 313, 455/317, 318, 323, 334, 341; 330/277, 297, 306, 307; 327/355, 357, 564; 361/736, 738, 748, 764, 783

[56] References Cited

U.S. PATENT DOCUMENTS

| | | | |
|---|---|---|---|
| 4,788,511 | 11/1988 | Schindler | 330/277 |
| 4,876,516 | 10/1989 | Dougherty | 330/277 |
| 5,021,743 | 6/1991 | Chu et al. | 330/277 |
| 5,146,178 | 9/1992 | Nojima et al. | 330/277 |
| 5,239,685 | 8/1993 | Moe et al. | 455/333 |

FOREIGN PATENT DOCUMENTS 0283074  9/1988  European Pat. Off. .
2565031  11/1985  France .

OTHER PUBLICATIONS

A. Chu, IEEE, "A 31-GHz Monolithic GaAs Mixer/Preamplifier Circuit for Receiver Applications", 1981, pp. 149–154.

C. Kermarrec, IEEE, "Monolithic Circuits For 12 GHz Direct Broadcasting Satellite Reception", 1982, pp. 5–10.

"A Low Cost High Performance MMIC, Low Noise Down-Converter for Direct Broadcast Satellite Reception" by Wallace et al, IEEE 1990, pp. 7–10.

GaAs IC Symposium, Tech. Digest 1985, "GaAs Monolithic Circuits For TV Tuners", P. Dautriche et al, Nov. 1985, pp. 165–168.

IEEE, vol. MTT-31, No. 12. Dec. 1983, GaAs Monolithic MIC's For Direct Broadcast Satellite Receivers, pp. 1089–1096.

IEEE, vol. 36, No. 4, Apr. 1988, One-Chip GaAs Monolithic Frequency Converter Operable to 4 GHz, pp. 653–658.

*Primary Examiner*—Reinhard J. Eisenzopf
*Assistant Examiner*—Nguyen Vo
*Attorney, Agent, or Firm*—Bernard Franzblau

[57] ABSTRACT

A semiconductor device including a plurality of interconnected functional blocks of integrated circuits, which include at least an amplifier block, the blocks operating at high and ultrahigh frequencies and having different frequencies with each block comprising at least a DC distribution line. Each block is polarized by the DC voltage of its distribution line and the blocks also include power-matched circuits operating in the ultrahigh frequency range. All of the high frequency and ultrahigh frequency functional blocks are integrated on one and the same substrate for realising the DC supply of all functional blocks at one and the same DC voltage value by one and the same DC voltage distribution line which is common to all the blocks. This is achieved, at least in part by the provision of frequency stabilization circuits for each individual functional amplifier block and also for the common DC distribution line, as well as autopolarization circuits for polarizing each block from the single DC voltage.

25 Claims, 7 Drawing Sheets

5,551,075

SEMICONDUCTOR DEVICE INCLUDING A PLURALITY OF INTERCONNECTED FUNCTIONAL INTEGRATED CIRCUIT BLOCKS OPERATING AT HIGH AND ULTRAHIGH FREQUENCIES, EACH HAVING A DC DISTRIBUTION LINE

BACKGROUND OF THE INVENTION

This invention relates to a semiconductor device including a plurality of interconnected functional blocks of integrated circuits, inter alia, at least an amplifier block, operating at high and ultrahigh frequencies and at different frequencies, each block comprising at least a DC distribution line, means for polarizing (biasing) each block by means of the DC voltage of its distribution line, said blocks also comprising power-matched circuits operating in the ultrahigh frequency range.

The invention is used for antenna reception modules for receiving television broadcasts which are directly transmitted by an artificial satellite (Direct Broadcast Satellite (DBS) receivers)) operating in the frequency band of 11.7 to 12.2 GHz.

The invention is also used in any converter circuit, for example, in the field of telecommunication or in on-board wireless systems.

Such a device is known from the publication entitled "A low cost high performance MMIC, low noise down converter for direct broadcast satellite reception" by P. Wallace, R. Michels, J. Bayruns et at. of the ANADIGIGS Inc. company in IEEE 1990 Microwave and Millimeter-wave Monolithic Circuit Symposium, pp. 7–10.

This publication describes a monolithic circuit comprising a low noise amplifier, a picture filter, an active mixer, an IF filter, an IF amplifier and a local oscillator.

This circuit is very compact. For its operation it additionally requires a dielectric resonator and two DC supplies, a positive one at +6 V and a negative one at −5 V. The circuit is realised by means of a process including GaAs MESFET transistors. It is provided with a housing and is mass produced for receiving television broadcasts.

This publication points out that for consumer use the cost price of the integrated circuit should be as low as possible. Hence, integrated circuit designers aim at products having a better, or at least equivalent performance but which is less expensive than those of their competitors.

This publication therefore states that it is necessary to combine as many functions as possible on one and the same substrate. For this reason the known device includes all of the above-mentioned functions as well as the decoupling circuits and the DC blocking capacitances.

However, the substrate does not include the dielectric resonator which is fixed to the housing, as well as the circuits for generating the DC supply voltages, which circuits constitute an additional external operating circuit.

SUMMARY OF THE INVENTION

It is one of the objects of the present invention to reduce the manufacturing costs of the final product, i.e. of either an on-board system or of the receiver input module for direct television broadcasts from an artificial satellite (DBS receiver), including both the integrated circuit for the frequency converter and its additional operating circuit while reducing the number of DC supply voltages required for operating the converter circuit.

According to the invention, the monolithic circuit has a single DC power supply, for example, +6 V for all of the functional blocks integrated on one and the same substrate.

To this end the device described in the opening paragraph is characterized in that it comprises means for integrating all of the high frequency and ultrahigh frequency functional blocks on one and the same substrate and for realising the DC supply of all functional blocks at one and the same DC voltage value by means of one and the same DC voltage distribution line which is common to all of the blocks, said means including frequency stabilization circuits for each individual functional amplifier block and also for the common DC voltage distribution line, as well as autopolarization (self-biasing) circuits for constituting the means for polarizing (biasing) each block by means of said single DC voltage.

Since only one DC power supply is used for operating the monolithic circuit, the complexity of the additional operating circuit is divided into two parts. Thus, the inventive object of reducing the overall cost of the device is achieved. However, a technical problem is present that all in of the functions of the monolithic circuit (amplifier, filters, local oscillator, etc.) arranged on one and the same substrate influence each other because they are coupled and have different operating frequencies. The technical problem which should finally be solved is that the polarization of the several coupled functions, operating at different frequencies, should be realised with one or several functional blocks operating at ultrahigh frequencies (12 GHz), while preventing the functions from influencing each other via the common polarization (bias) path. Moreover, this biasing should be realised with very simple means, i.e. with very simple circuit elements which can be integrated on the same substrate as the converter and which should not raise the cost of the latter.

This problem is solved by the device according to the invention.

Moreover, substantial additional advantages are obtained when the device is used as a converter whose various functions are activated by means of a single supply.

It is to be noted that satellites transmit in different frequency bands for television broadcasts. The dielectric resonator in the input circuit of the receiver should thus be differently controlled for reception in each of these bands in the known device as well as in the device according to the invention.

However, as far as the known circuit is concerned, whose radio frequency amplifier has a narrow frequency band and whose filter is independent of this amplifier, a different converter circuit should be provided for each satellite broadcast frequency band, with an amplifier and a filter each having a shifted band of opening frequencies.

In contrast, according to the invention, means have been developed to avoid this drawback. The same converter can thus be used for all transmission bands. Only the control of the resonator is to be changed. This allows mass-production of converter circuits, thus also reducing the cost.

According to the invention the amplifier therefore comprises means for increasing the width of its opening band so that all transmission bands are covered. Moreover, the filter is included in the amplifier. This filter comprises a first resonant circuit at the picture frequency which is closest to the opening band and which must be rejected, as well as a second resonant circuit at substantially the same picture frequency but slightly shifted with respect to the first circuit for producing a larger band effect of this filter, resulting in a larger filtering efficiency. These circuits are connected between the drain of the last amplifier transistor and ground.

BRIEF DESCRIPTION OF THE DRAWINGS

These and other aspects of the invention will be apparent from and will be elucidated with reference to the embodiments described hereinafter in connection with the accompanying drawing.

In the drawings.

DESCRIPTION OF THE PREFERRED EMBODIMENTS

Figure 1:
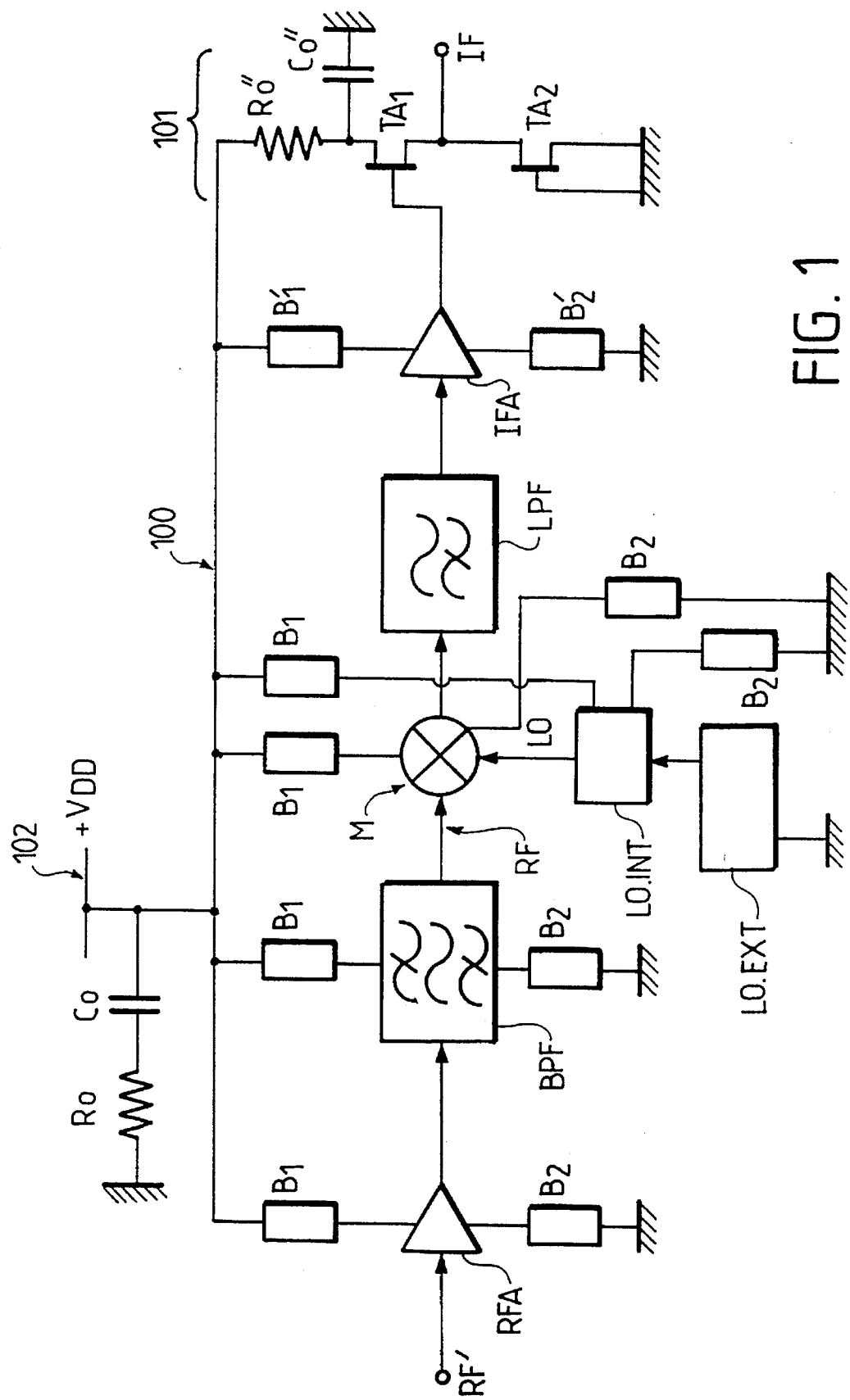
FIG. 1 is a circuit diagram of the converter circuit.

FIG. 1 shows an integrated monolithic circuit operating at high and ultrahigh frequencies and having a plurality of interconnected functional blocks operating at different frequencies. This integrated circuit has only one input 102 for a single positive DC voltage $+V_{DD}$ and has first means constituted by frequency stabilization circuits comprising at least a high-pass circuit $R_0$–$C_0$ for decoupling the DC supply with respect to ground and a low-pass circuit $R''_0$–$C''_0$ for decoupling the drain of a field effect transistor stage 101. The circuit also has means constituted by autopolarization (self-bias) circuits $B_1$, $B_2$ or $B'_1$, $B'_2$ comprising $R_1$, $R_2$ and decoupling circuits $R'_0$–$C'_0$ and $C_2$, or decoupled active charges.

The supply voltage $+V_{DD}$ is distributed to the different blocks by means of a common supply line 100. In the relevant range of high and ultrahigh frequencies this common supply line behaves as a transmission line and produces parasitic feedback effects between the different functions, which contributes to a disturbance of the frequencies and to instability of the amplifier blocks.

According to the invention, these bad effects do not exist.

This result is obtained in that the common supply line 100 has at least one common decoupling circuit with respect to ground. This common decoupling circuit comprises a capacitance $C_0$ arranged between the line and ground. Parasitic feedback effects are thus eliminated. This circuit also comprises a resistor $R_0$ which is arranged in series with the capacitance $C_0$ between this capacitance and ground. Oscillations are thus eliminated.

This result is also obtained in that in the circuit at least a field effect transistor stage, preferably a buffer stage 101, has a capacitance $C''_0$ for decoupling the drain and a resistor $R''_0$ between said drain and the supply line 100. This results in a perfect stability of the amplifier blocks of the integrated circuit.

Thus it is possible to supply all of the blocks of the integrated circuit by means of the single, common supply line 100 connected to the input $+V_{DD}$ (102).

As is shown in FIG. 1, the integrated monolithic circuit comprises the following blocks realised on one and the same substrate:

- an amplifier RFA receiving a radio frequency signal RF' and supplying the signal RF,
- a bandpass filter BPF receiving the signal from the amplifier RFA,
- a local oscillator comprising two blocks: an external block LO.EXT secured to the housing of the integrated circuit and comprising a dielectric resonator which can be adapted for each band of the integrated circuit and an internal block LO.INT which receives the signal LO' from the external block and supplies the signal LO;
- a mixer M which receives the signal RF from the RF filter-amplifier chain and the signal LO of the local oscillator and which supplies a signal IF' at the intermediate frequency;
- a low-pass filter LPF which receives the signal IF',
- an intermediate frequency amplifier IFA which receives the signal from the filter LPF and supplies the output signal IF of the integrated circuit at the intermediate frequency.

This converter circuit MMIC is notably used in an antenna reception module (DBS receiver) for television broadcasts transmitted by artificial satellites. However, it may alternatively be used for numerous telecommunication purposes as well as for reception and transmission.

For the sake of clarity of the description, the different blocks of the converter will hereinafter be described separately. However, only two autopolarization techniques are used for the implementation of these blocks.

The first autopolarization technique will be described with reference to the blocks RFA, BPF, LO.INT, M and the second technique will be described with reference to the block IFA.

Example I

The amplifier block RFA at the radio frequency RF.

In the integrated frequency converter circuit according to the invention, the radio frequency amplifier RFA is associated with the bandpass filter BPF. These circuits are shown diagrammatically in FIG. 2c.

In a receiver system, as in the proposed converter circuit, it is necessary to arrange an amplifier block at the input for reducing the noise factor. The amplifier may be constituted by one or several stages. Preferably, it has four field effect transistor stages $T_1$, $T_2$, $T_3$, $T_4$.

The first autopolarization technique, which is applied to the amplifier RFA, will be described with reference to FIGS. 2a and 2b.

Figure 2B:
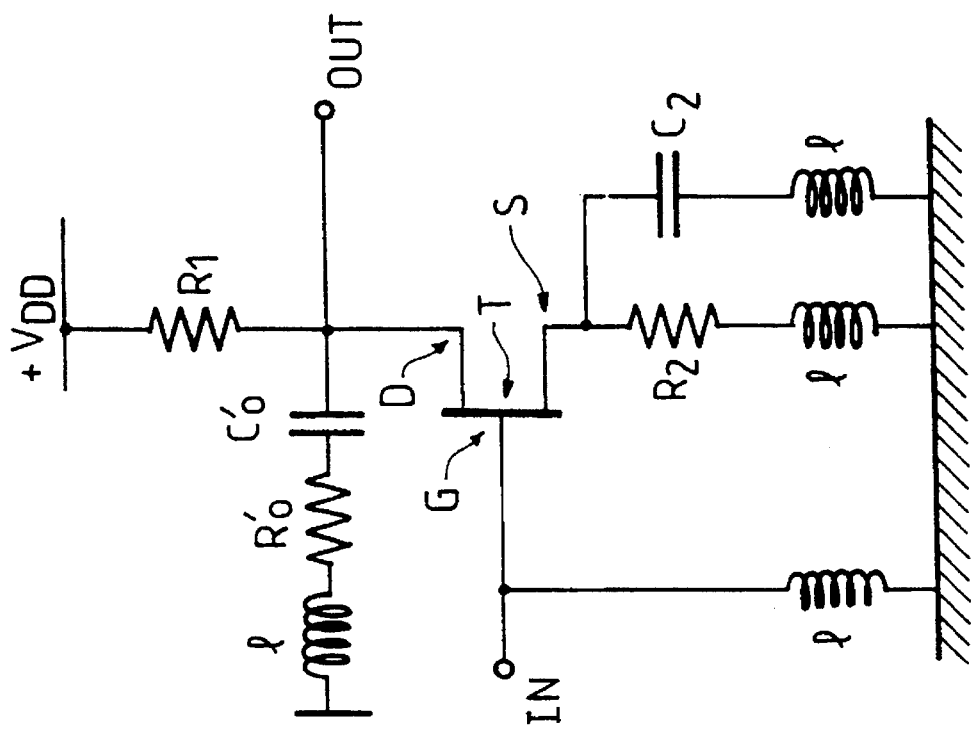
FIG. 2b shows the same stage in the AC operating state.
Figure 2A:
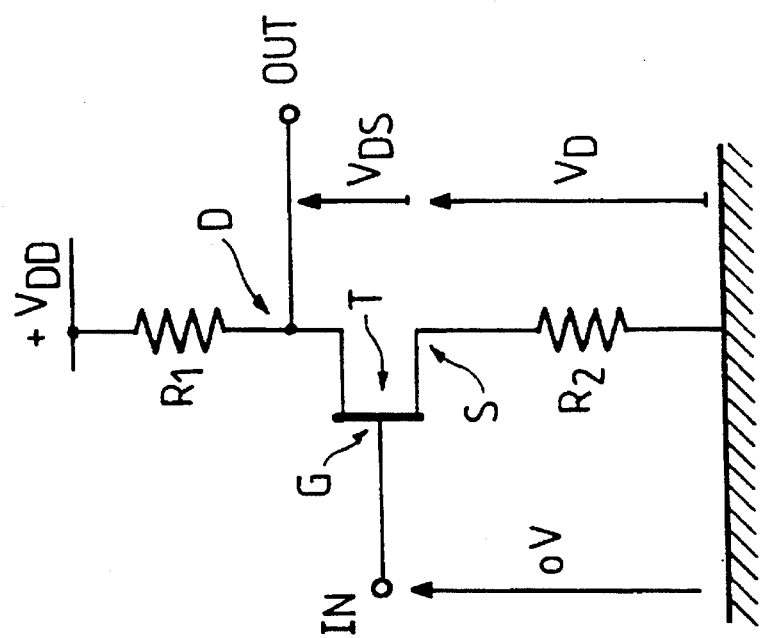
FIG. 2a shows an RF amplifier stage in the DC operating state.

Considering an amplifier stage from the point of view of DC voltages, as illustrated in FIG. 2a, a field effect transistor T providing an inverter function has a gate G, a drain D and a source S.

For realising the autopolarization of this transistor, the drain D is connected to the common supply line $+V_{DD}$ (100) via a resistor $R_1$ and the source S is connected to ground via a resistor $R_2$.

The voltage at the terminal of the resistor $R_2$ determines the source voltage $V_s$; the gate has a zero DC potential $V_G=0$; the voltage at the terminal of the resistor $R_1$ determines the drain voltage $V_D$. The value of the gate-source voltage $V_{GS}$ required for each amplifier stage is thus obtained as a function of the values of the resistors $R_1$, $R_2$ and the value of the DC voltage $+V_{DD}$:

$$V_{GS}=V_G-V_S=-V_S, \text{ because } V_G=0$$

as well as the value of the drain-source voltage $V_{DS}$ required for the operation of the stage.

The amplifier stage shown in FIG. 2a is thus autopolarized in accordance with said first technique.

Considering the same amplifier stage from the point of view of AC operation, as is illustrated in FIG. 2b, the resistors $R_1$ and $R_2$ are decoupled so as to avoid parasitic effects, i.e. possible oscillations, shifts of the frequency band, loss of gain, etc.

As the elements of the circuit are connected to ground by means of wires, for example, gold wires, and as these different elements are interconnected by means of integrated connections having a non-zero length, all these connection means should be taken into account because they constitute non-negligible inductances.

As is illustrated in FIG. 2b, each amplifier stage comprises the following steps for autopolarization:

decoupling of the resistor $R_2$ via the capacitance $C_2$ in parallel between the source and ground, grounding of the gate by means of a connection producing a small inductance 1, grounding the elements $R_2$ and $C_2$ by means of connections producing an inductance 1.

Figure 2C:
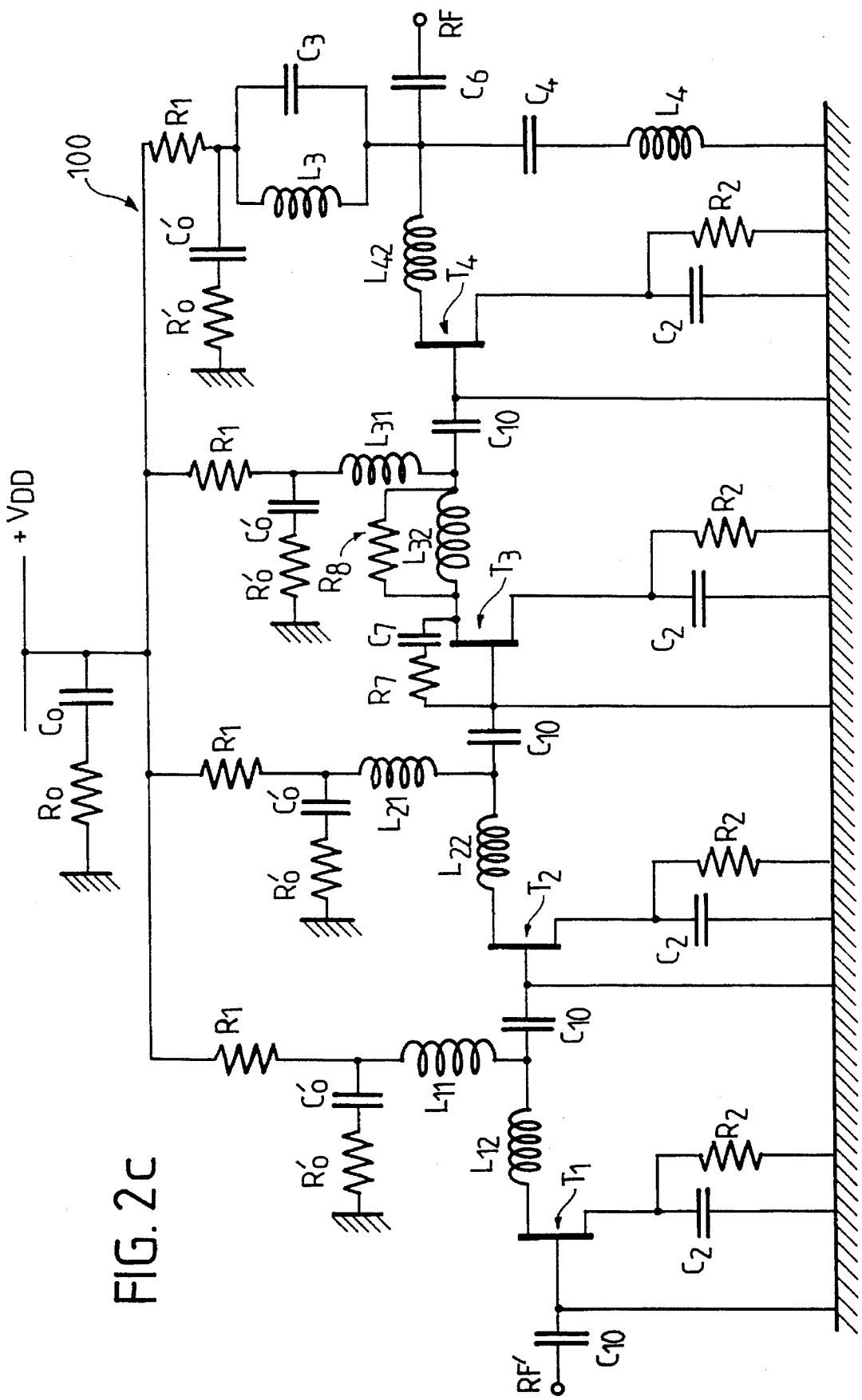
FIG. 2c shows the RF amplifier of the converter and the bandpass filter.

As is illustrated in FIGS. 2b and 2c, the three first amplifier stages comprise the following steps for autopolarization:

decoupling of the resistor $R_1$ by means of the capacitance $C'_0$ arranged between the drain and ground, with the addition of a resistor $R'_0$ arranged in series with the capacitance $C'_0$ between this capacitance and ground. The series resistor $R'_0$ may have a low value as it is used for eliminating parasitic oscillations which are due to the fact that the connection of the decoupling circuit $R'_0$–$C'_0$ to ground produces the small inductance 1.

The amplifier RFA is unconditionally stable, notably due to the presence of the resistors $R'_0$ in the drain decouplings of the transistor amplifier stages.

The output of each amplifier stage RFA also has means for adaptation between the stages, as is shown in FIG. 2c.

These adaptation circuits comprise an inductance $L_2$ arranged in series with a blocking capacitance $C_{10}$ between the drain of the transistor of a stage and the gate of the subsequent transistor, and a second inductance $L_1$ in series with said inductance $L_2$ between the drain output and ground.

When calculating the values of these inductances $L_1$ and $L_2$, the value introduced by the connections between elements, constituting transmission lines in AC operation, should be taken into account, as has been stated hereinbefore.

The adaptation network of the amplifier comprises the inductances $L_{11}$–$L_{12}$, $L_{21}$–$L_{22}$ and $L_{31}$–$L_{32}$ for the first, second and third stages, respectively.

The adaptation network at the output of the last stage or the fourth stage of the amplifier in the circuit shown in FIG. 2c comprises filtering elements required for rejecting the image band. These filtering elements comprise:

a series resonant circuit having an inductance $L_4$ and a capacitance $C_4$, a parallel resonant circuit having an inductance $L_3$ and a capacitance $C_3$; which circuits are connected between the output (i.e. the drain) of the last amplifier stage RFA and ground. The output or drain of this last stage also comprises, in series, the inductance $L_{42}$.

The parallel resonant circuit $L_3$–$C_3$ resonates at the picture frequency which is closest to the operating band and which must be rejected. The series resonant circuit $L_4$–$C_4$, in which sections of the transmission lines constituted by connections between elements and connections to ground should be taken into account, substantially resonates at the same picture frequency, but is slightly shifted with respect to the frequency of the parallel resonant circuit $L_3$–$C_3$.

The result of this structure is that the filter BPF thus constituted has a larger band effect and a greater filtering efficiency than the filter structure known in the state of the art.

The filtering operation is optimized by means of the inductance $L_{42}$ arranged at the drain of the last transistor $T_4$ and by means of the output capacitance $C_6$ of the amplifier RFA, as is shown in FIG. 2c.

FIG. 2c also shows that in the adaptation of the third stage of the amplifier a resistor $R_8$ is arranged in parallel with the inductance element $L_{32}$. This resistor $R_8$ is used for reducing the coefficient of the quality of the inductance $L_{32}$ and thus to enhance the stability of the amplifier RFA.

A supplementary means for enhancing the stability of the amplifier RFA is provided by the resistive negative feedback constituted by the resistor $R_7$ arranged between the drain and the gate of the transistor $T_3$ of the third amplifier stage RFA, in series with the blocking capacitance $C_7$.

Examples of values for the elements with which the circuit of FIG. 2c is realised are given in Table I.

The structure of the amplifier and the filter described above leads to a circuit having a larger band than the circuit known in the state of the art. Consequently, this integrated circuit, as shown in FIG. 1, can be used for all frequency bands for television broadcasts transmitted via artificial satellites. According to the invention, the integrated circuit is unique for all frequency bands. Only the external control of the dielectric resonator will have to be changed for each housing if it is to be used for different frequency bands.

The state-of-the-art circuit can only be used for a single frequency band for transmitting television broadcasts and in the current state of the art it would be necessary to have approximately 3 different integrated circuits for covering the different transmission frequency bands.

Example II

The mixer.

Figure 3B:
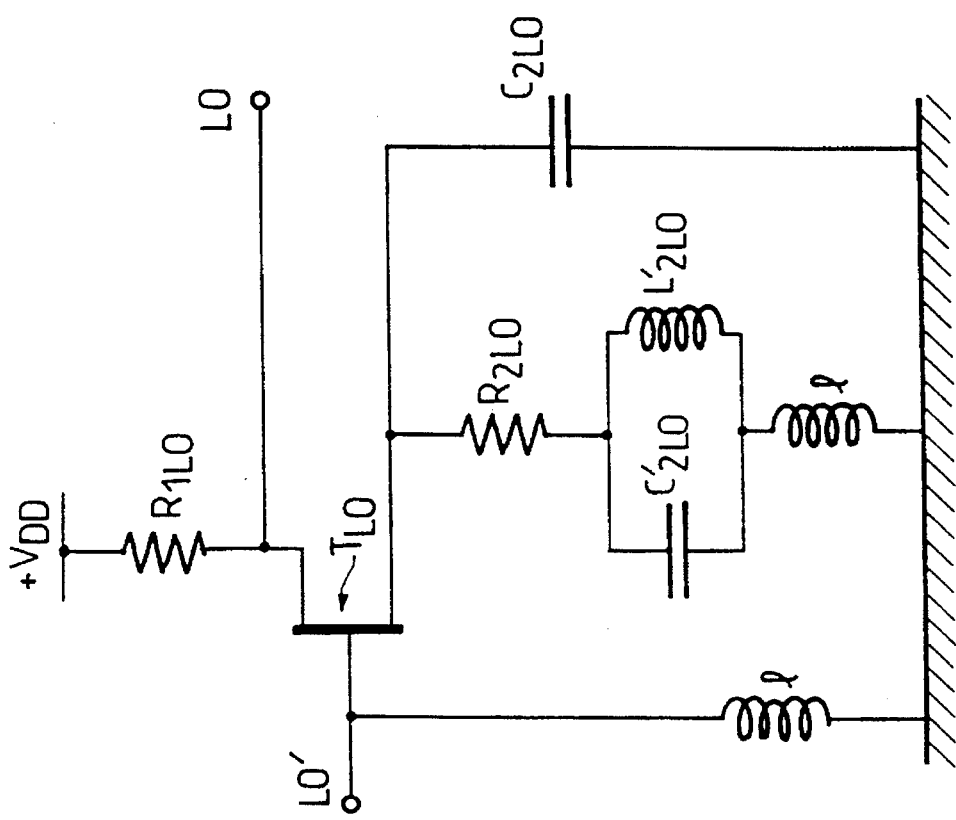
FIG. 3b shows the oscillator stage in the AC operating state.
Figure 3A:
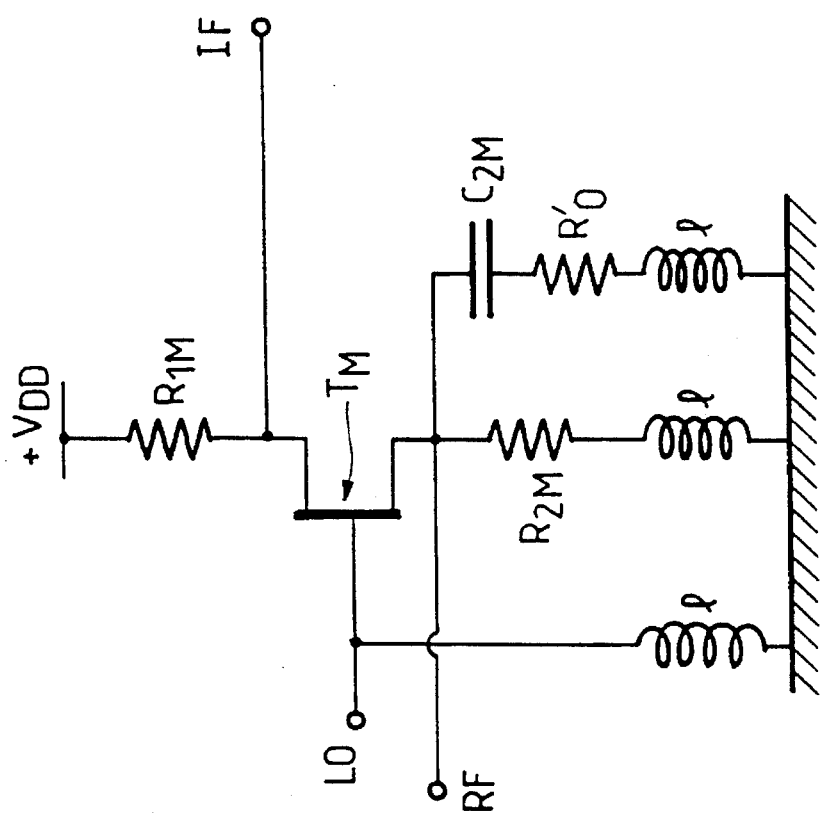
FIG. 3a shows the mixer stage in the AC operating state.
Figure 3C:
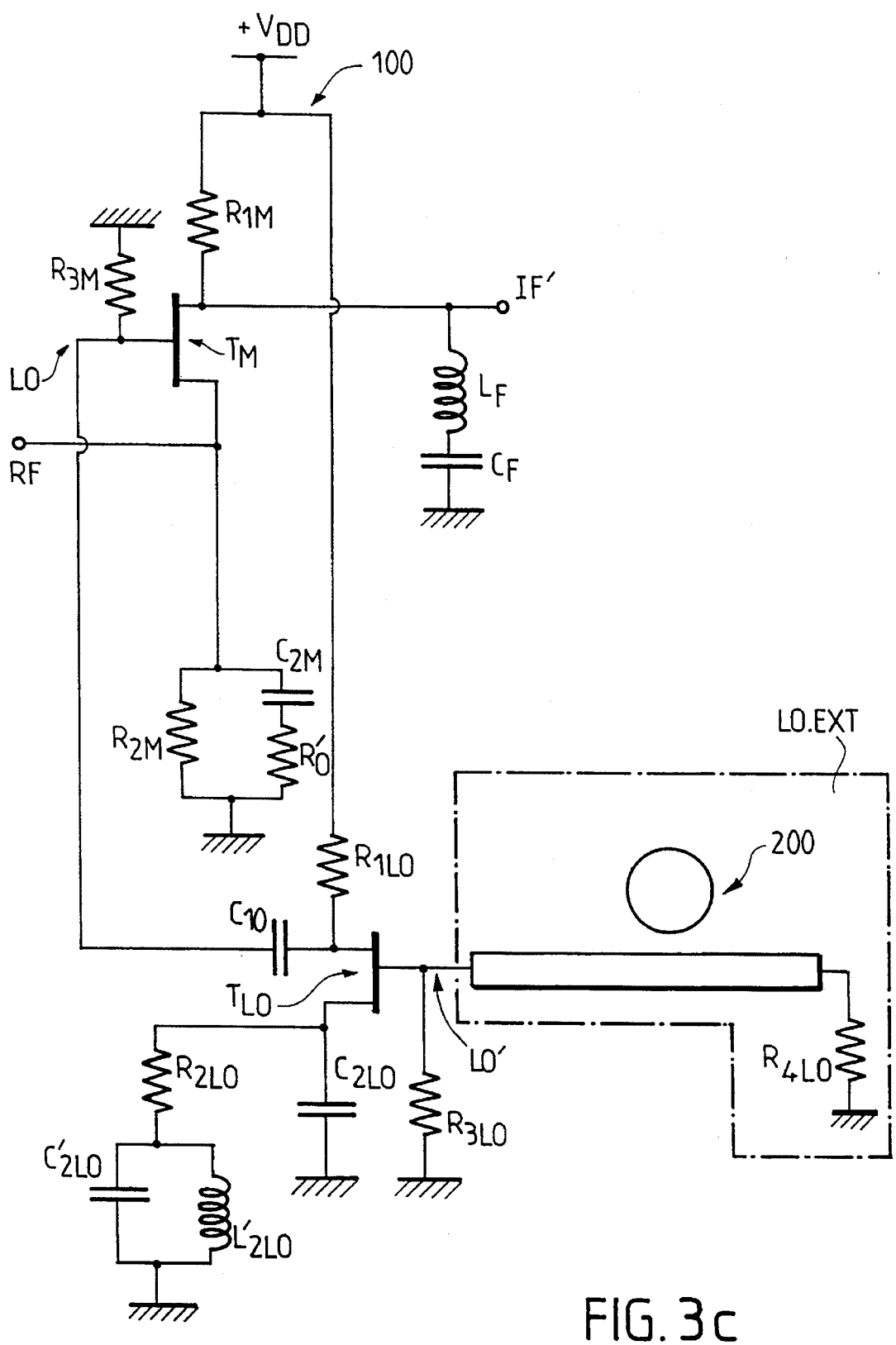
FIG. 3c shows the mixer and oscillator stages and the external oscillator of the converter circuit.

The mixer circuit M and the integrated part of the local oscillator LO.INT are shown in FIG. 3c.

The mixer circuit M comprises a field effect transistor $T_M$ to which said first autopolarization technique described with reference to FIGS. 2a and 2b is applied.

The autopolarization structure used for the mixer M is shown in FIG. 3a and comprises a resistor $R_{1M}$ arranged between the drain of the transistor $T_M$ and the common supply line 100. This resistor $R_{1M}$ is not decoupled. This autopolarization structure also comprises a resistor $R_{2M}$ arranged between the source of the transistor $T_M$ and ground. This resistor $R_{2M}$ is decoupled, in the manner as described above, by means of a capacitance $C_{2M}$ and in this case a resistor $R'_0$ intended to prevent oscillations is arranged in series with the capacitance $C_{2M}$ between this capacitance and ground.

For calculating the elements of the autopolarization system of the mixer, the lengths and dimensions of the connections between the elements and between the elements and ground in the form of small inductances 1, as described above, should be taken into account.

The radio frequency amplifier RFA applies the signal RF through its last adaptation network to the source of the transistor $T_M$ used for mixing the frequencies, and a signal LO from the local oscillator (LO.INT+LO.EXT) is directly applied to the gate electrode of the same transistor, as is shown in FIG. 3c.

The mixture of the first and second signals leads to an intermediate frequency signal IF:

$$IF=|RF-LO|$$

In the example of television transmission by satellite
RF≈12 GHz
LO≈10 GHz
IF≈2 GHz

Example III

The local oscillator.

This oscillator circuit is shown in FIG. 3c. It comprises an external part secured to the housing of the integrated circuit, which part is denoted by LO.EXT.

This external part comprises a dielectric resonator 200 which should be adjusted for each frequency and is realised on a substrate, as well as a resistor $R_{4LO}$. The invention does not relate to this part.

The local oscillator also comprises an internal part LO.INT realised on the substrate of the integrated circuit of the converter and including a field effect transistor $T_{LO}$ which receives a DC supply voltage $+V_{DD}$ via the common line 100.

Consequently, the internal part LO.INT comprises autopolarization means of the transistor $T_{LO}$ which are illustrated in FIG. 3b and are of the type as described hereinbefore.

As is shown in FIGS. 3b and 3c, the autopolarization structure used for LO.INT comprises a resistor $R_{1LO}$ arranged between the drain and the common supply line 100 and at least one resistor $R_{2LO}$ arranged at the source of the transistor $T_{LO}$.

The oscillator structure LO.INT also comprises the transistor $T_{LO}$ with a capacitance $C_{2LO}$ at its source for generating a negative resistance.

The drain of the transistor $T_{LO}$ constitutes the output LO of the oscillator and is directly connected to the input LO of the mixer M.

The gate of transistor $T_{LO}$ receives the signal LO' from the external resonator LO.EXT, which determines the oscillation frequency.

To ensure both the stability of the converter circuit as a whole and the efficiency of the oscillator, the source of the transistor $T_{LO}$ is connected to a circuit resonating in the useful band of the oscillator LO.INT. This resonant circuit is of the parallel type and comprises the inductance $L'_{2LO}$ and a capacitance $C'_{2LO}$. It is arranged in series with the autopolarization resistor $R_{2LO}$ and realises its decoupling. It is not possible to use exactly the same type of source decoupling in the local oscillator LO.INT as that described with reference to FIG. 2b for the amplifier RFA. The effect of the capacitance $C_{2LO}$ realising the negative resistance should not be disturbed. The circuit $L'_{2LO}$–$C'_{2LO}$ has the advantage that it does not disturb the effect of the capacitance $C_{2LO}$ and that it is not very sensitive to the presence of ground connections producing small inductances 1. In the present case it is the resistor $R_{2LO}$ and the circuit $L_{2LO}$–$C'_{2LO}$ arranged between the source and ground which condition the DC voltage of the source $(V_S)$.

At the resonance frequency of the circuit $L'_{2LO}$–$C'_{2LO}$ the circuit is open and the capacitance $C_{2LO}$ does not "see" the autopolarization circuit. The capacitance $C_{2LO}$ is thus not modified and, as a result, it has the correct value for producing the appropriate negative resistance.

FIG. 3c also shows the low-pass filter block LPF. It is constituted by a series resonant circuit comprising the inductance $L_F$ and the capacitance $C_F$ arranged in series between the drain of the mixer transistor $T_M$ and ground.

This filter $L_F$–$C_F$ is used for suppressing the signal at the frequency LO of the local oscillator in the rest of the converter chain.

The parallel resonant circuit $L'_{2LO}$–$C'_{2LO}$ may be replaced by a series resonant circuit, provided that this leads to the same result.

The last converter block described in the following example benefits from a second autopolarization system.

Values for realising the blocks described in this example are given in Table II.

Example IV

The intermediate frequency amplifier IFA.

Figure 4A:
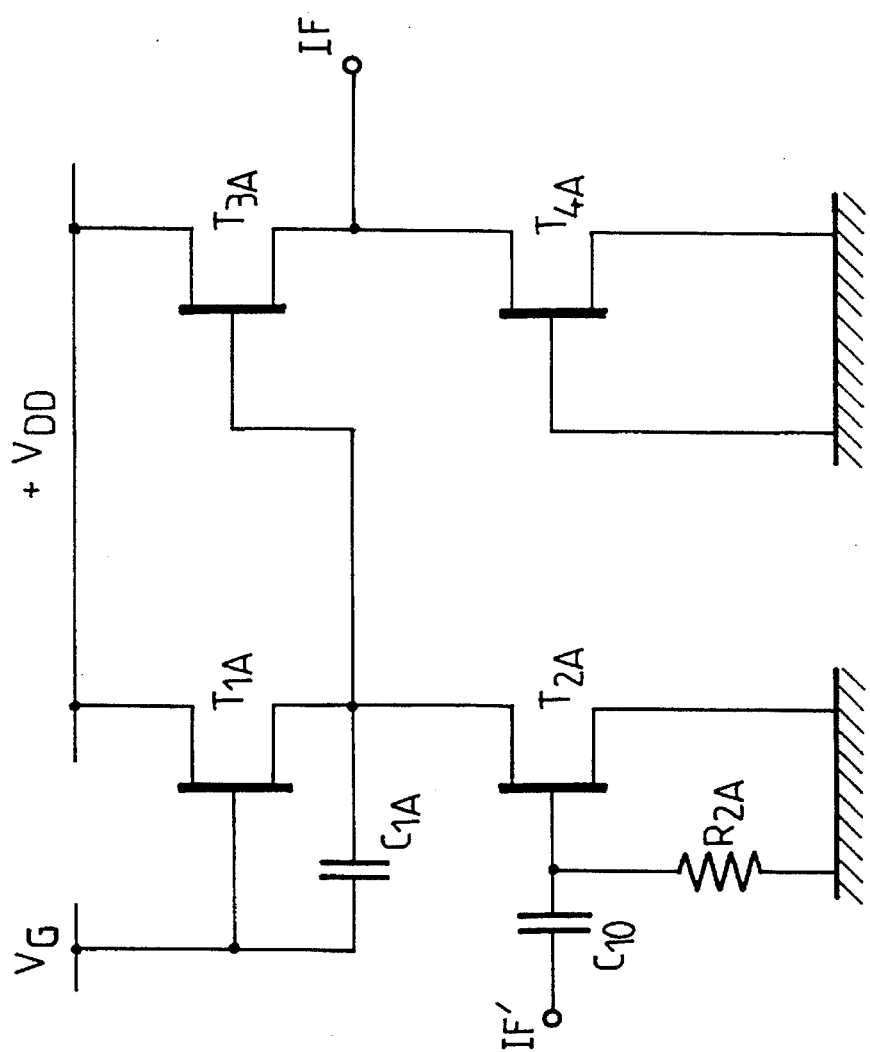
FIG. 4a shows an IF amplifier stage of the converter and FIG. 4b shows the IF amplifier of the converter with an output buffer stage.
Figure 4B:
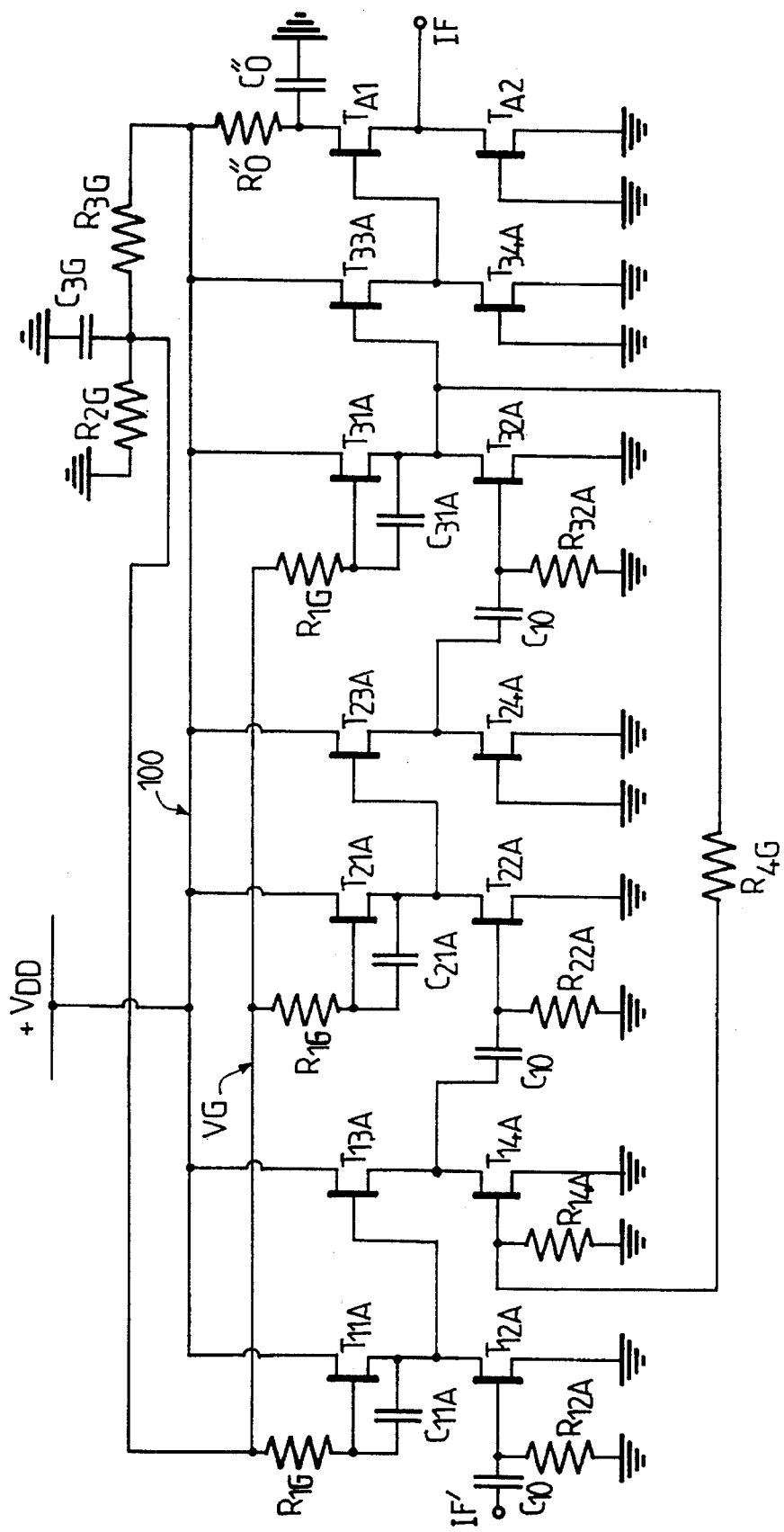

The intermediate frequency amplifier circuit IFA is shown in FIG. 4b.

The operating frequency of this circuit which receives the signal IF from the mixer is relatively low. Its structure is arranged to provide voltage amplification.

The output of the mixer is directly connected to an inverter buffer stage via a coupling capacitance $C_{10}$. A total number of 3 inverter buffer stages is used.

Each inverter buffer stage is autopolarized. The autopolarization system of such a stage is shown in FIG. 4a. The circuit IFA is polarized from the common supply line 100.

As is shown in FIG. 4a, a stage comprises a transistor $T_{2A}$ constituting an inverter and having an active load $T_{1A}$, arranged as a current source and polarized at $V_{GS}=0$. The stage also comprises a transistor $T_{3A}$ constituting a buffer with the transistor $T_{4A}$. The transistor $T_{4A}$ is arranged as a current source and polarized at $V_{GS}=0$. The transistor $T_{3A}$ is connected at its common drain to the common voltage supply line 100.

The circuit constituted by the capacitance $C_{1A}$ arranged between the gate and the source of the transistor $T_{1A}$, and by the resistor $R_{2A}$ arranged between the gate and ground of the inverter transistor $T_{2A}$ provides the possibility of adjusting the low cut-off frequency of the circuit by a correct choice of the values of these elements.

It should be noted that a DC supply voltage $+V_G$ which is smaller than $+V_{DD}$ is used for polarization, but this voltage is still positive, and is derived using a bridge of resistors $R_{2G}$, $R_{3G}$, $R_{4G}$ and $R_{1G}$ (FIG. 4b).

To adapt the output of the amplifier IFA to its load, a supplementary buffer stage 101 is used, as is shown in FIG. 4b.

To ensure the stability of the amplifier IFA, a resistor $R''_0$ is arranged between the drain of the transistor $T_{A1}$ of the latter buffer stage, arranged in common drain configuration, and the common supply line 100. A decoupling capacitance $C''_0$ is also introduced in the same drain configuration. These two elements are necessary for stabilizing the assembly of mixer M and amplifier IFA.

Values for realising the block described in this example are given in Table III.

Thus, by means of the two circuits for stabilizing the frequencies of the converter $R_0 \, C_0$ and $R''_0 \, C''_0$ and by means of the autopolarization techniques individually applied for each block and using transistor stages, the converter circuit described, or any circuit having a similar technical problem, can be polarized by using only one input for a DC voltage, and may have one common supply line for all of the blocks.

The invention can thus be used for any monolithic integrated circuit having several coupled functional blocks operating at high and/or ultrahigh frequencies and having a DC supply line and a ground connection. The problem is solved because the distribution line in this circuit is a common line which supplies all the coupled functional blocks with the same DC voltage, which blocks are provided with polarization means for this DC voltage, and this circuit comprises circuits for frequency stabilization of the functional blocks, including at least a circuit for decoupling the common line with respect to ground with a capacitance and a resistor arranged in series between the line and ground, and a circuit for decoupling the drain of a transistor stage with a resistor between the drain of the transistor and the common line and a capacitance between the drain and ground.

Consequently, the negative DC voltage which is necessary in the state-of-the-art circuit need not be generated in the integrated circuit according to the invention.

It is to be noted that not only a circuit $R_0$-$C_0$ but 2 of such circuits arranged between the common line 100 and ground may be provided on the substrate. This will contribute to even better results.

Table IV states the values preferred for realising the stabilization circuits.

A ribbon conductor coil is used in the circuit for realising an integrated inductance. In the Tables the inductances are characterized by the width and the length of the ribbon conductor in μm.

TABLE I

ELEMENTS OF THE AMPLIFIER RFA

| Capacitances | Resistors | Inductances |
|---|---|---|
| $C_{10} \simeq 1$ pF | $R_1 \simeq 200\Omega$ | $L_{11} \simeq 10/1100$ (μm/μm) |
| $C_{12} \simeq 5$ pF | $R_2 \simeq 25\Omega$ | $L_{12} \simeq 10/1000$ (μm/μm) |
| $C'_0 \simeq 5$ pF | $R'O \simeq 25\Omega$ | $L_{21} \simeq 10/1350$ (μm/μm) |
| $C_7 \simeq 0,1$ pF | $R_7 \simeq 10$ kΩ | $L_{22} \simeq 10/1300$ (μm/μm) |
| $C_4 \simeq 0,15$ pF | $R_8 \simeq 1$ kΩ | $L_{31} \simeq 5/400$ (μm/μm) |
| $C_6 \simeq 0,3$ pF | | $L_{32} \simeq 10/1600$ (μm/μm) |
| | | $L_3 \simeq 5/550$ (μm/μm) |
| | | $L_{42} \simeq 5/1200$ (μm/μm) |

Lengths of the gates of the transistors (Lg)

Lg ($T_1$) = 300 μm
Lg ($T_2$) = 160 μm
Lg ($T_3$) = 160 μm
Lg ($T_4$) = 160 μm

TABLE II

Elements of the mixer M, the local oscillator and the low-pass filter
Lengths of the gates of the transistors (Lg)

| $L_g (T_M) \simeq 200\mu$ | | $L_g (T_{LO}) \simeq 200\mu$ |
|---|---|---|
| Capacitances | Resistors | Inductances |
| $C_{2M} \simeq 5$ pf | $R_{2M} \simeq 700\,\Omega$ | $L'_{2LO} \simeq 10/100$ (μ/μ) |
| $C_{2LO} \simeq 0,1$ pf | $R'_o \simeq 25\Omega$ | $L_F \simeq 5/1200$ (μ/μ) |
| $C'_{2LO} \simeq 0,25$ pf | $R_{3LO} \simeq 10$ kΩ | |
| $C_{10} \simeq 3$ pf | $R_{3M} \simeq 5$ kΩ | |
| $C_F \simeq 0,1$ pf | $R_{1M} \simeq 1$ kΩ | |
| | $R_{1LO} \simeq 110\Omega$ | |

TABLE III

ELEMENTS OF THE AMPLIFIER IFA

| Lengths of the gates of the transistors (Lg) | | Resistors | Inductances |
|---|---|---|---|
| Lg ($T_{11}$) = 40 μm | Lg ($T_{13}$) = 40 | $R_{12} = 2$ kΩ | $C_{11} = 0.3$ pF |
| Lg ($T_{12}$) = 40 μm | Lg ($T_{14}$) = 20 | $R_{14} = 10$ kΩ | $C_{20} = 0.3$ pF |
| Lg ($T_{21}$) = 20 μm | Lg ($T_{23}$) = 30 | $R_{22} = 10$ kΩ | $C_{31} = 0.3$ pF |
| Lg ($T_{22}$) = 20 μm | Lg ($T_{24}$) = 15 | $R_{32} = 10$ kΩ | $C_{1G} = 2$ pF |
| Lg ($T_{31}$) = 20 μm | Lg ($T_{33}$) = 30 | $R_{1G} = 2$ kΩ | |
| Lg ($T_{32}$) = 20 μm | Lg ($T_{34}$) = 15 | $R_{2G} = 5$ kΩ | |
| Lg ($T_{A1}$) = 100 | Lg ($T_{A2}$) = 40 | $R_{3G} = 5$ kΩ | |
| μm | μm | $R_{4G} = 4$ kΩ | |

TABLE IV

| $R_0 \simeq 30\Omega$ | $R''_0 \simeq 100$ a $120\Omega$ | $V_{DD} = +6V$ |
|---|---|---|
| $C_0 \simeq 1$ pF | $C''_0 \simeq 60$ a $100$ pF | $V_G = +3V$ |

We claim:

1. A semiconductor device comprising: a plurality of interconnected high frequency and ultrahigh frequency functional blocks positioned in close proximity and which together form an integrated circuit including at least an ultra high frequency amplifier block, said blocks including transistor stages operating at different frequencies, a DC voltage distribution line common to said blocks, means for biasing each block by means of a DC supply voltage of said DC voltage distribution line, said blocks also comprising power-matched circuits operating in the ultrahigh frequency range, wherein all of the high frequency and ultrahigh frequency functional blocks are integrated on one and the same substrate and, in order to provide the DC supply voltage of all functional blocks by means of said DC voltage distribution line which is common to all of the blocks, said device includes a frequency stabilization circuit for said amplifier block and another frequency stabilization circuit for the common DC voltage distribution line, and self-biasing circuits for biasing each block by means of said DC supply voltage.

2. A device as claimed in claim 1, wherein the frequency stabilization circuit for the common DC distribution line comprises at least a filter for said line, and in that in a functional block formed by transistor stages the frequency stabilization circuit includes filter in at least one of its transistor stages.

3. A semiconductor device comprising a plurality of interconnected functional blocks which form an integrated circuit including at least an amplifier block and with said blocks operating at high and ultrahigh frequencies and at different frequencies, a DC supply voltage distribution line common to all of the blocks, means for biasing each block by means of the DC supply voltage of said distribution line, said blocks also comprising power-matched circuits operating in the ultrahigh frequency range, wherein all of the high frequency and ultrahigh frequency functional blocks are integrated on one and the same substrate, a frequency stabilization circuit for said amplifier block and a further frequency stabilization circuit for the common DC supply voltage distribution line, self-biasing circuits for biasing each block by means of said DC supply voltage, wherein the frequency stabilization circuit for the common DC distribution line comprises at least a filter for said line, and in that in each functional block formed by transistor stages the frequency stabilization circuit comprises a filter in at least one of its transistor stages, wherein in an amplifier block including transistor stages operating at ultrahigh frequencies the self-biasing circuit comprises a respective resistor between the respective drains of the transistors of each stage and a common line for determining the drain voltage, a respective resistor between the source and ground for determining the source voltage, and a respective connection between the gate and ground for determining the zero gate voltage, and wherein each respective source is decoupled by means of a respective capacitance connected between the respective source and ground.

4. A device as claimed in claim 3, including an amplifier block comprising a transistor stage operating at high frequencies having a self-biasing circuit that comprises a transistor with an active load including a field effect transistor coupled between the drain of said transistor and the common line with said transistor biased at the zero gate-source voltage ($V_{GS}=0$), and wherein said amplifier block also comprises at least a filter for adjusting its frequency.

5. A device as claimed in claim 4, wherein the functional blocks comprise:
- a radio frequency amplifier operating in the ultra high frequency range,
- a bandpass or high-pass filter coupled to the radio frequency amplifier and to an active mixer,
- a local oscillator coupled to said active mixer,
- a low-pass filter coupled to said active mixer,
- and an intermediate frequency amplifier coupled to the low-pass filter and operating in the high frequency range.

6. A device as claimed in claim 5, wherein in the radio frequency amplifier the frequency stabilization circuit comprises a high-pass filter connected to the drain of the transistors of each amplifier stage.

7. A device as claimed in claim 6, wherein the bandpass filter block comprises a first series resonant circuit having an inductance and a capacitance, and a second parallel resonant circuit having an inductance and a capacitance, the two circuits being connected between the output of a last transistor stage of the radio frequency amplifier and ground, the first and the second circuit resonating at slightly different frequencies.

8. A device as claimed in claim 5 wherein, the intermediate frequency amplifier has an output connected to a first buffer stage having a first transistor and a second transistor arranged as a current source with its gate biased at the zero gate-source voltage ($V_{GS}=0$), and wherein the frequency stabilization circuit of said intermediate frequency amplifier includes a low-pass filter with a resistor coupled between the drain of the first transistor and the common supply line, and a capacitance coupled between the drain of said first transistor and ground.

9. A device as claimed in claim 8, wherein the intermediate frequency amplifier includes a supplementary buffer stage is coupled between the output of the amplifier and said first buffer stage and including a third transistor connected in common drain configuration to the common line and a fourth transistor arranged as a current source with its gate biased at the zero gate-source voltage.

10. A device as claimed in claim 5, wherein the active mixer block includes an autopolarization circuit which comprises a first resistor which is not decoupled for determining the drain voltage of a transistor stage and a second resistor for determining the source voltage, wherein the second resistor is decoupled by means of a branch comprising a third resistor and a first capacitance in series, and in the local oscillator block the self-biasing circuit comprises a fourth resistor which is not decoupled for determining the drain voltage of a further transistor stage and a fifth resistor for determining the source voltage, wherein the fifth resistor is decoupled by means of a circuit, between said fifth resistor and ground, said circuit resonating at the local oscillator frequency and comprising a second capacitance and a first inductance in parallel, and wherein the low-pass filter block comprises a circuit including a second inductance and a third capacitance connected in series between the output of the mixer and ground.

11. A device as claimed in claim 6 wherein the power matched circuit of the ultrahigh frequency amplifier block includes inductances connected between the transistor drain of each transistor stage and ground, and inductances coupled between each transistor stage.

12. A device as claimed in claim 6 wherein, the intermediate frequency amplifier has an output connected to a first buffer stage having a first transistor, and a second transistor arranged as a current source with its gate biased at the zero gate-source voltage, and wherein the frequency stabilization circuit of said intermediate frequency amplifier includes a low-pass filter with a resistor coupled between the drain of the first transistor and the common supply line, and a capacitance coupled between the drain of said first transistor and ground.

13. A semiconductor device comprising: a plurality of interconnected functional blocks forming an integrated circuit with certain blocks operating at different frequencies and formed of series transistor stages,
- an ultrahigh frequency amplifier block having power matched circuit means for operation at ultrahigh frequencies,
- and functional blocks operating at high frequencies with each individual functional block comprising:
- a DC voltage distribution line and a ground line for supplying said series transistor stages with a positive biasing voltage,
- wherein all of the high frequency and ultra high frequency functional blocks are integrated on one and the same substrate and are supplied by one and the same biasing voltage by means of one and the same DC voltage distribution line and one and the same ground line and which are common to all of the functional blocks,
- wherein, for achieving a common integrated circuit and a common DC supply, the device comprises;
- a frequency stabilization circuit including an isolating capacitor and a serial dampening resistor coupled between said common DC voltage distribution line and said common ground line,
- biasing circuits, operating as self-biasing circuits, in all of the functional blocks, for biasing transistor drain, source and gate of each transistor stage by means of said common DC voltage distribution line and common ground line, a frequency stabilization circuit applied to one transistor stage in a said high frequency block and including a drain resistor connected between the drain of the stage transistor and said common DC distribution line, and a drain decoupling capacitor connected to said common ground line, and a further frequency stabilization circuit applied to all transistor stages in said ultrahigh frequency amplifier block and comprising an isolating capacitor and a serial dampening resistor decoupling the drain biasing circuit of the transistor stage to the common ground line.

14. A device as claimed in claim 13, wherein said ultrahigh frequency amplifier block comprises;

self-biasing circuits which include, in each transistor stage:

a drain biasing resistor connected to the transistor drain and to said common DC distribution line and decoupled by said further frequency stabilization circuit, a source biasing resistor connected to the transistor source and to said common ground line and decoupled by a parallel capacitor, and a gate biasing self-impedance formed by a connection line between the transistor gate and said common ground line for deriving a zero gate biasing voltage.

15. A device as claimed in claim 14, wherein said high frequency functional blocks include a high frequency amplifier block having series inverter transistor stages, the self-biasing circuits in the high frequency amplifier include, in each inverter transistor stage, a load FET transistor coupled between the drain of the inverter transistor and said common DC voltage distribution line, and a supplementary voltage distribution line, whose supply voltage is derived from the supply voltage of said common DC voltage distribution line via a resistor bridge, for biasing the load FET transistor gate to a zero gate voltage through a resistor connected to the gate of said load FET transistor and to said supplementary voltage distribution line, and wherein said high frequency amplifier further comprises, in each inverter transistor stage, a filter circuit having a capacitor coupled between gate and source of the load FET transistor, and a resistor coupled between the gate of the inverter transistor and said common ground line, for adjusting said high frequency.

16. A device as claimed in claim 15, wherein the blocks comprise:

a radio frequency (RF) amplifier block operating in the ultrahigh frequency range, a bandpass or high-pass filter block, an active mixer block for converting the frequency, a local oscillator block coupled to said active mixer block, a low-pass filter (LPF) block, an intermediate frequency (IF) amplifier block operating in the high frequency range, a buffer stage coupled to the IF amplifier block, and means coupling said RF amplifier block, said filter block, said active mixer block, said LPF block, and said IF amplifier block in cascade.

17. A device as claimed in claim 16, wherein the radio frequency amplifier block has a frequency stabilization circuit applied to each transistor drain of each series transistor stage.

18. A device as claimed in claim 17, wherein the bandpass filter (BPF) block comprises a series resonant circuit having a first inductance and a first capacitance, and a parallel resonant circuit having a second inductance and a second capacitance, said resonant circuits being connected between the output of the last radio frequency amplifier transistor stage and said common ground line, the series and the parallel resonant circuits resonating at slightly different frequencies.

19. A device as claimed in claim 18, wherein the matched circuit means of the ultrahigh frequency amplifier block includes inductances connected between the transistor drain of each transistor stage and said common ground line and inductances coupled between each transistor stage.

20. A device as claimed in claim 16, wherein the intermediate frequency amplifier block has an output connected to a first buffer stage having a first transistor, and a second transistor arranged as a current source with its gate biased at the zero gate-source voltage, and wherein the frequency stabilization circuit of said intermediate frequency block is a low-pass filter with a resistor coupled between the drain of the first transistor and the common DC distribution line, and a capacitance coupled between the drain of said first transistor and the common ground line.

21. A device as claimed in claim 20, wherein the intermediate frequency amplifier block includes a supplementary buffer stage coupled between the output of the last transistor stage of the amplifier and said first buffer stage and formed by a third transistor connected in common drain configuration to the common DC distribution line and a fourth transistor coupled as a current source with its gate biased at the zero gates-source voltage.

22. A device as claimed in claim 21, wherein the active mixer block includes a self-biasing circuit which comprises a first resistor which is not decoupled for determining the drain voltage of a transistor stage and a second resistor for determining the source voltage, wherein the second resistor is decoupled by means of a branch comprising a third resistor and a first capacitance connected in series, and wherein in the local oscillator block the self-biasing circuit comprises a fourth resistor which is not decoupled for determining the drain voltage of a further transistor stage and a fifth resistor for determining the source voltage, wherein the fifth resistor is decoupled by means of a circuit, between said fifth resistor and said common ground line, said circuit resonating at the local oscillator frequency and comprising a second capacitance and a first inductance in parallel, and wherein the low-pass filter block comprises a circuit including a second inductance and a third capacitance connected in series between the output of the mixer and ground.

23. A device as claimed in claim 16, wherein the active mixer block has a self biasing circuit which comprises a first resistor which is not decoupled for determining the drain voltage of a transistor stage and a second resistor for determining the source voltage, wherein the second resistor is decoupled by means of a branch comprising a third resistor and a first capacitance in series, and wherein the local oscillator block has a self-biasing circuit comprising a fourth resistor which is not decoupled for determining the drain voltage of a further transistor stage and a fifth resistor for determining the source voltage, wherein the fifth resistor is decoupled by means of a circuit, between said fifth resistor and said common ground line, said circuit resonating at the local oscillator frequency and comprising a second capacitance and a first inductance in parallel, and wherein the low-pass filter block comprises a circuit including a second inductance and a third capacitance connected in series between the output of the mixer block and said common ground line.

24. A device as claimed in claim 17, wherein, in the intermediate frequency amplifier block, the output of the amplifier circuit is connected to a first buffer stage having a first transistor, and a second transistor arranged as a current source with its gate biased at the zero gate-source voltage, and wherein the frequency stabilization circuit of said IF amplifier block is a low-pass filter with a resistor coupled between the drain of the first transistor and the common supply line, and a capacitance coupled between the drain of said first transistor and said common ground line.

25. A device as claimed in claim 18, wherein, in the intermediate frequency amplifier block, the output of the amplifier circuit is connected to a first buffer stage having a first transistor, and a second transistor arranged as a current source with its gate biased at the zero gate-source voltage, and wherein the frequency stabilization circuit of said IF amplifier block is a low-pass filter with a resistor coupled between the drain of the first transistor and the common supply line, and a capacitance coupled between the drain of said first transistor and ground.

* * * * *